United States Patent
Stoian et al.

(10) Patent No.: US 8,387,723 B2
(45) Date of Patent: Mar. 5, 2013

(54) DRILLING FLUID AND METHOD FOR DRILLING IN COAL-CONTAINING FORMATIONS

(75) Inventors: Stefan Alexandru Stoian, Calgary (CA); Carl Keith Smith, Calgary (CA)

(73) Assignee: Tech-Star Fluid Systems Inc., Calgary (CA)

( * ) Notice: Subject to any disclaimer, the term of this patent is extended or adjusted under 35 U.S.C. 154(b) by 581 days.

(21) Appl. No.: 12/529,583

(22) PCT Filed: Mar. 3, 2008

(86) PCT No.: PCT/CA2008/000425
§ 371 (c)(1),
(2), (4) Date: Dec. 22, 2009

(87) PCT Pub. No.: WO2008/106786
PCT Pub. Date: Sep. 12, 2008

(65) Prior Publication Data
US 2010/0089650 A1     Apr. 15, 2010

Related U.S. Application Data

(60) Provisional application No. 60/892,672, filed on Mar. 2, 2007.

(51) Int. Cl.
*E21B 21/00* (2006.01)
*C09K 8/05* (2006.01)
*C09K 8/16* (2006.01)

(52) U.S. Cl. ........... 175/72; 507/140; 507/141; 507/145
(58) Field of Classification Search ................. None
See application file for complete search history.

(56) References Cited

U.S. PATENT DOCUMENTS

| | | | |
|---|---|---|---|
| 4,664,843 A | 5/1987 | Burba, III et al. | |
| 5,260,269 A * | 11/1993 | Hale et al. | 507/136 |
| 5,337,824 A | 8/1994 | Cowan | |
| 5,363,918 A | 11/1994 | Cowan et al. | |
| 5,439,056 A | 8/1995 | Cowan | |
| 5,821,203 A | 10/1998 | Williamson | |
| 5,975,220 A * | 11/1999 | Mueller et al. | 175/65 |
| 6,148,917 A | 11/2000 | Brookey et al. | |
| 7,199,085 B2 * | 4/2007 | Rea et al. | 507/202 |
| 2003/0078306 A1 | 4/2003 | Hoy | |
| 2003/0201103 A1 * | 10/2003 | Brookey et al. | 166/283 |
| 2004/0099446 A1 * | 5/2004 | Schlemmer | 175/65 |
| 2005/0003967 A1 * | 1/2005 | Rea et al. | 507/200 |
| 2005/0022992 A1 * | 2/2005 | Di Lullo Arias et al. | 166/285 |
| 2006/0019834 A1 | 1/2006 | Melbouci et al. | |
| 2007/0135311 A1 | 6/2007 | Van Der Horst | |
| 2007/0197399 A1 | 8/2007 | Sau et al. | |

FOREIGN PATENT DOCUMENTS

| CN | 1236008 C | 1/2006 |
|---|---|---|
| CN | 1290964 C | 12/2006 |

* cited by examiner

*Primary Examiner* — George Suchfield
(74) *Attorney, Agent, or Firm* — Bennett Jones LLP

(57) ABSTRACT

A drilling fluid and method for drilling in a coal containing formation. The method includes: providing a mixed metal-viscosified drilling fluid including at least 1% potassium salt; circulating the drilling fluid through the well; and drilling into a coal seam.

14 Claims, No Drawings

DRILLING FLUID AND METHOD FOR DRILLING IN COAL-CONTAINING FORMATIONS

FIELD

This invention relates to methods and fluids used for drilling and completing oil wells.

BACKGROUND

The process of drilling a hole in the ground for the extraction of a natural resource requires a fluid for removing the cuttings from the wellbore, lubricating and cooling the drill bit, controlling formation pressures and maintaining hole stability.

Many earth formations contain coal seams through which a wellbore must be drilled to either access the coal itself or reservoirs of interest below the coal.

For coal bed methane (CBM) wells, minimization of formation damage is paramount given the lower permeability of coal seams than conventional reservoirs. A fluid that minimizes the formations damage and reduces whole mud loss by limiting the invasion into the cleats and fractures and permits easy flow back has been developed, termed herein the mixed metal-viscosified drilling fluids including mixed metal oxide (MMO), mixed metal hydroxide (MMH) and combinations of mixed metal oxide and hydroxide (MMOH). The mixed metal-viscosified drilling fluids contain a mixed metal viscosifier, which is an inorganic particle based on magnesium/aluminum oxides and/or hydroxides. The mixed metal particles have a cationic character and react electrostatically with clay particles. Mixed metal-viscosified drilling fluids include an aqueous-based mixture of at least one of the mixed metal moieties and an amount of bentonite. The rheology of mixed metal-viscosified drilling fluids limits fluid invasion into the formation due to high viscosity but the main formation protection comes from the formation of an external filter cake that is easy to remove. Simple displacement to water or brine should be sufficient for the well to flow back and remove the filter cake.

Unfortunately, however, the rheology of mixed metal-viscosified drilling fluids has broken down when coming into contact with coal fines generated from drilling into coal seams, especially young coal. When the drilling fluid comes in contact with coal fines generated by drilling through the seams, the fluid thins, moving toward the rheology of water and therefore loses many of its beneficial properties. Since coal seams are, in fact, often considered loss zone formations, and are weak and friable, the unsuitability of mixed metal-viscosified drilling fluids for drilling in coal containing formations is particularly problematic.

SUMMARY OF THE INVENTION

In accordance with a broad aspect of the present invention, there is provided a method for drilling in a coal containing formation, the method comprising: providing a mixed metal-viscosified drilling fluid including at least 1% potassium salt; circulating the drilling fluid through the well; and drilling into the coal seam.

In accordance with another broad aspect of the present invention, there is provided a drilling fluid comprising: an aqueous mixture of bentonite and a mixed metal viscosifier with a pH above about pH 10; and at least 1% potassium salt.

It is to be understood that other aspects of the present invention will become readily apparent to those skilled in the art from the following detailed description, wherein various embodiments of the invention are shown and described by way of example. As will be realized, the invention is capable for other and different embodiments and its several details are capable of modification in various other respects, all without departing from the spirit and scope of the present invention. Accordingly the detailed description and examples are to be regarded as illustrative in nature and not as restrictive.

DESCRIPTION OF VARIOUS EMBODIMENTS

The detailed description and examples set forth below are intended as a description of various embodiments of the present invention and are not intended to represent the only embodiments contemplated by the inventor. The detailed description includes specific details for the purpose of providing a comprehensive understanding of the present invention. However, it will be apparent to those skilled in the art that the present invention may be practiced without these specific details.

Until now mixed metal (MMO, MMH and MMOH) viscosified drilling fluids have been used generally unsuccessfully in coal seams due to the fluid thinning effect from the coal. It is believed that the polyanionic nature of coal fines, such as of lignite and lignosulfonates, interfere with the electrostatic interactions of the mixed metal moiety and the bentonite in the drilling fluid, sometimes resulting in a complete collapse of the fluid's rheology.

We have determined that some salts reduce or prevent the thinning effect from drilling coals with MMO, MMH and MMOH viscosified fluids. Potassium salts including one or more of potassium sulfate, potassium chloride, potassium acetate and potassium formate may substantially maintain the rheology of mixed metal-viscosified drilling fluids when drilling with coal contaminants. Such salts may add a benefit of shale swelling inhibition, possibly as a result of the presence of the potassium ion from the salt.

A wide range of potassium salt concentrations, such as concentrations greater than 1% (weight by volume), may be effective in the mixed metal-viscosified drilling fluid. Generally concentrations of 1-10% (weight by volume) salt and, for example, 1-5% salt (weight by volume) concentrations have been found to be both effective for stabilizing the drilling fluid against adverse rheological changes due to coal contamination and advantageous in terms of economics. The amount of salt added to the drilling fluid may be determined by the amount of coal to be drilled and/or by the shale reactivity. For example, younger coals, more so than older coals, tend to create greater rheological instability for mixed metal-viscosified drilling fluids and, thus, higher concentrations (for example greater than 3% and for example 3-10%) of potassium salts in the drilling fluid may be useful. Also, if it is determined that there are significant coal deposits through which the well must be drilled, again higher concentrations of potassium salts may be useful.

Although the salt may be added after the coal contamination occurs, it is recommended to pre-treat the system for best results. In one embodiment, for example, the surface hole can be drilled down to approximately the level of the first coal deposit using any drilling fluid of interest, including for example, prior art mixed metal-viscosified drilling fluids. When it is determined that the coal seam is close below bottom hole or when the coal seam has been reached, the drilling fluid may be changed over to a drilling fluid according to the present invention, including a mixed metal-viscosified drilling fluid containing an amount of a potassium salt.

Alternately, the borehole may be drilled down to and through a coal seam using a drilling fluid according to the present invention. For example, the entire well substantially from surface, which it will be appreciated may include drilling from surface or from below the overburden or after the casing point, may be drilled using a drilling fluid according to the present invention.

After drilling through the coal seams in the path of the borehole, the present drilling fluid may continue to be used for the remainder of the wellbore or other drilling fluids may be used. However, if coal fines may continue to become entrained in the drilling fluid, for example where a coal seam remains open to contact by the drilling fluid, it may be useful to continue using the present drilling fluid until drilling is complete or the possibility of coal contamination is eliminated. If desired, the drilling fluid returning to the mud tanks at surface may be monitored to determine the concentration of potassium salt therein, as well as other parameters, to ensure that appropriate levels and fluid characteristics are maintained. For example, any one or more of the bentonite, mixed metal viscosifier, base, or potassium salt may be added during drilling to adjust the drilling fluid parameters. In one embodiment, for example, an amount of mixed metal viscosifier may be added to the fluid during the course of a drilling operation where reactive formations are drilled and drill cuttings become incorporated to and change the rheology of the drilling fluid. In such a case, the addition of an amount of mixed metal viscosifier can cause the viscosity of the fluid to increase.

As will be appreciated, the drilling fluid may be circulated through the drill string, drill bit and well bore annulus while drilling. Circulation of the drilling fluid may continue even when drilling is stopped in order to condition the well, prevent string sticking, etc.

During the drilling and circulation, the yield point of the drilling fluid may be maintained above 10 Pa to provide advantageous effects.

Mixed metal-viscosified drilling fluids include bentonite and a mixed metal viscosifier in water and are pH controlled.

Bentonite is commonly used in drilling fluids and its use will be well understood by those skilled in the art. While various forms of bentonite may be used, bentonites that contain polyanionic additives or impurities should be avoided, with consideration as to the electrostatic interaction of the bentonite and MMOH. An untreated bentonite may be particularly useful. Such a bentonite may be known commercially as untreated bentonite with a high content of sodium montmorillonite or untreated Wyoming bentonite.

Mixed metal viscosifiers are commercially available such as from BASF Oilfield Polymers Inc. under the trademark Polyvis™.

Generally, mixed metal-viscosified drilling fluids may include low concentrations of bentonite (for example, about 15 to 45 kg/m3 or 20 to 40 kg/m3 bentonite in water). Considering that many bentonite based (non-mixed metal) drilling fluids can contain many multiples more (i.e. two to four times) bentonite than in a mixed metal-viscosified drilling fluid, it can be appreciated that the viscosity generated using such low concentrations of bentonite for mixed metal-viscosified drilling fluids might be insufficient for hole cleaning. The addition of mixed metal oxide, mixed metal hydroxide or mixed metal oxide and hydroxide at a weight ratio of 1:8 to 1:12 or 1:9.5 to 1:10.5 to the bentonite produces a stable fluid when the pH is initially maintained above about 10.0 and possibly between about 10.5 and 13, as may be achieved by addition of caustic soda, caustic potash, potassium carbonate and/or soda ash. Once the bentonite/mixed metal viscosifier reaction is complete and a gel is formed, it appears that the pH can be lowered to pH 9 or possibly even lower without any significant loss in viscosity.

In one embodiment, a mixed metal-viscosified drilling fluid may include an aqueous mixture of about 30 kg/m3 bentonite, a mixed metal moiety in a quantity of about 1:10 MMO, MMH or MMOH to bentonite, pH controlled to greater than pH 11 and 1 to 5% potassium salt.

Additives for fluid loss control, lost circulation, etc. may be added to the drilling fluid mixture, as desired. Non or minor-ionic additives may be most useful. Some examples may include starch for fluid loss reduction, organophillic lost circulation materials (LCM), etc. Simple testing may verify the compatibility of any particular additive with the drilling fluid.

To produce the drilling fluid, the bentonite may first be hydrated in water. Then the mixed metal moiety is added and pH is adjusted. The potassium salt can be added to the aqueous mixture of bentonite and mixed metal any time before it is needed for drilling with coal contamination. Additives such as LCM, fluid loss control agents, etc. can also be added when appropriate, as will be appreciated.

A typical drilling fluid formulation may be according to Table 1.

TABLE 1

A typical drilling fluid useful for drilling in coal-containing formations

| Product | Concentration | Notes |
|---|---|---|
| Untreated bentonite | 30 kg/m3 | Prehydrate first in fresh water |
| MMH or MMO or MMOH | 3 kg/m3 | |
| Caustic Soda | 0.5 to 1 kg/m3 | To control pH at 11-12.5 |
| Potassium Sulfate | 20 to 50 kg/m3 | |
| Starch | 5 to 10 kg/m3 | |

The following examples are included for the purposes of illustration only, and are not intended to limit the scope of the invention or claims.

EXAMPLES

Example I

In the following examples, drilling fluids were prepared according to the sample descriptions by hydrating the bentonite, adding the mixed metal moiety and adjusting the pH, as needed. Thereafter, any additives, including potassium salt if any, were added.

To simulate coal contamination, lignite was added.

The rheological properties have been tested using a Fann 35 and Brookfield viscometers.

TABLE 2

Composition of Sample #1

| Products | Sample #1 |
|---|---|
| Untreated Bentonite | 30 kg/m3 |
| MMH | 3 kg/m3 |
| Caustic | 0.5 kg/m3 |
| Starch | 10 kg/m3 |

TABLE 3

Results without the addition of Salt

| Mud Properties | Sample #1 | Sample #1 + 5 kg/m3 Lignite | Sample #1 + 15 kg/m3 Lignite |
|---|---|---|---|
| 600 RPM | 86 | 47 | 43 |
| 300 RPM | 64 | 29 | 25 |
| 200 RPM | 53 | 21 | 18 |
| 100 RPM | 40 | 13 | 10 |
| 6 RPM | 19 | 2 | 1.5 |
| 3 RPM | 17 | 1 | 1 |
| 10 sec Gel (Pa) | 8 | 1 | 0.5 |
| PV (mPa * s) | 22 | 18 | 18 |
| YP (Pa) | 21 | 5.5 | 9 |
| LSRV (cP) | 54,000 | 12,000 | 0 |
| Temperature (° C.) | 22.8 | 22.3 | 23.0 |

TABLE 4

Results using Potassium Chloride

| Mud Properties | Sample #1 + 2% KCl | Sample #1 + 2% KCl + 5 kg/m3 Lignite | Sample #1 + 2% KCl + 15 kg/m3 Lignite |
|---|---|---|---|
| 600 RPM | 66 | 47 | 44 |
| 300 RPM | 52 | 31 | 27 |
| 200 RPM | 46 | 23 | 21 |
| 100 RPM | 38 | 16 | 14 |
| 6 RPM | 18 | 4 | 3 |
| 3 RPM | 16 | 3 | 2 |
| 10 sec Gel (Pa) | 7 | 2 | 1.5 |
| PV (mPa * s) | 14 | 16 | 17 |
| YP (Pa) | 19 | 7.5 | 5 |
| LSRV (cP) | 25,000 | 12,000 | 9,000 |
| Temperature (° C.) | 21.6 | 22.1 | 22.3 |

TABLE 5

Results using Potassium Acetate

| Mud Properties | Sample #1 + 2% Pot. Acetate | Sample #1 + 2% Pot. Acetate + 5 kg/m3 Lignite | Sample #1 + 2% Pot. Acetate + 15 kg/m3 Lignite |
|---|---|---|---|
| 600 RPM | 66 | 52 | 48 |
| 300 RPM | 47 | 38 | 35 |
| 200 RPM | 39 | 32 | 29 |
| 100 RPM | 30 | 25 | 22 |
| 6 RPM | 12 | 10 | 10 |
| 3 RPM | 8 | 8 | 7 |
| 10 sec Gel (Pa) | 4 | 4 | 4 |
| PV (mPa * s) | 13 | 14 | 13 |
| YP (Pa) | 20 | 12 | 11 |
| LSRV (cP) | 31,000 | 20,000 | 12,000 |
| Temperature (° C.) | 23.2 | 23.3 | 23.2 |

Note:
Lignite dissolves slower.

TABLE 6

Results using Potassium Formate

| Mud Properties | Sample #1 + 2% Pot. Formate | Sample #1 + 2% Pot. Formate + 5 kg/m3 Lignite | Sample #1 + 2% Pot. Formate + 15 kg/m3 Lignite |
|---|---|---|---|
| 600 RPM | 66 | 47 | 42 |
| 300 RPM | 53 | 32 | 28 |
| 200 RPM | 47 | 26 | 22 |
| 100 RPM | 38 | 18 | 16 |
| 6 RPM | 19 | 6 | 5 |
| 3 RPM | 18 | 4 | 4 |
| 10 sec Gel (Pa) | 7 | 2 | 2 |
| PV (mPa * s) | 13 | 15 | 14 |
| YP (Pa) | 20 | 8.5 | 7 |
| LSRV (cP) | 21,000 | 13,000 | 12,000 |
| Temperature (° C.) | 22.1 | 22.3 | 22.6 |

TABLE 7

Results using Calcium Nitrate

| Mud Properties | Sample #1 + 2% Calcium Nitrate | Sample #1 + 2% Calcium Nitrate + 5 kg/m3 Lignite | Sample #1 + 2% Calcium Nitrate + 15 kg/m3 Lignite |
|---|---|---|---|
| 600 RPM | 60 | 57 | 47 |
| 300 RPM | 46 | 42 | 34 |
| 200 RPM | 38 | 34 | 28 |
| 100 RPM | 31 | 27 | 22 |
| 6 RPM | 12 | 11 | 7 |
| 3 RPM | 9 | 9 | 5 |
| 10 sec Gel (Pa) | 5 | 5 | 3 |
| PV (mPa * s) | 14 | 15 | 13 |
| YP (Pa) | 16 | 13.5 | 10.5 |
| LSRV (cP) | 33,000 | 23,000 | 22,000 |
| Temperature (° C.) | 21.5 | 22.1 | 22.7 |

Note: Lignite dissolves slower.

TABLE 8

Results using Calcium Chloride

| Mud Properties | Sample #1 + 2% Calcium Chloride | Sample #1 + 2% Calcium Chloride + 5 kg/m3 Lignite | Sample #1 + 2% Calcium Chloride + 15 kg/m3 Lignite |
|---|---|---|---|
| 600 RPM | 61 | 51 | 47 |
| 300 RPM | 44 | 35 | 34 |
| 200 RPM | 36 | 30 | 29 |
| 100 RPM | 27 | 22 | 23 |
| 6 RPM | 10 | 8 | 8 |
| 3 RPM | 8 | 7 | 6 |
| 10 sec Gel (Pa) | 3.5 | 3.5 | 3 |
| PV (mPa * s) | 17 | 16 | 13 |
| YP (Pa) | 13.5 | 9.5 | 10.5 |
| LSRV (cP) | 27,000 | 23,000 | 22,000 |
| Temperature (° C.) | 24.4 | 24.4 | 24.2 |

Note:
Lignite dissolves slower.

TABLE 9

Results using Potassium Sulfate

| Mud Properties | Sample #1 + 2% Pot. Sulfate | Sample #1 + 2% Pot. Sulfate + 5 kg/m3 Lignite | Sample #1 + 2% Pot. Sulfate + 15 kg/m3 Lignite |
| --- | --- | --- | --- |
| 600 RPM | 75 | 42 | 34 |
| 300 RPM | 60 | 29 | 21 |
| 200 RPM | 52 | 24 | 16 |
| 100 RPM | 41 | 18 | 11 |
| 6 RPM | 21 | 8 | 2.5 |
| 3 RPM | 19 | 7 | 2 |
| 10 sec Gel (Pa) | 9 | 4 | 2.5 |
| PV (mPa * s) | 15 | 13 | 13 |
| YP (Pa) | 22.5 | 8 | 4 |
| LSRV (cP) | 32,000 | 30,000 | 25,000 |
| Temperature (° C.) | 24.4 | 24.0 | 21.3 |

TABLE 10

Results using Potassium Chloride

| Mud Properties | Sample #1 + 5% KCl | Sample #1 + 5% KCl + 5 kg/m3 Lignite | Sample #1 + 5% KCl + 15 kg/m3 Lignite |
| --- | --- | --- | --- |
| 600 RPM | 61 | 52 | 46 |
| 300 RPM | 49 | 39 | 35 |
| 200 RPM | 45 | 35 | 32 |
| 100 RPM | 42 | 32 | 30 |
| 6 RPM | 16 | 15 | 15 |
| 3 RPM | 12 | 11 | 10 |
| 10 sec Gel (Pa) | 6 | 6 | 5 |
| PV (mPa * s) | 12 | 13 | 11 |
| YP (Pa) | 18.5 | 13 | 12 |
| LSRV (cP) | 30,000 | 18,000 | 21,000 |
| Temperature (° C.) | 20.1 | 20.1 | 20.1 |

TABLE 11

Results using Potassium Acetate

| Mud Properties | Sample #1 + 5% Pot. Acetate | Sample #1 + 5% Pot. Acetate + 5 kg/m3 Lignite | Sample #1 + 5% Pot. Acetate + 15 kg/m3 Lignite |
| --- | --- | --- | --- |
| 600 RPM | 63 | 48 | 44 |
| 300 RPM | 55 | 37 | 36 |
| 200 RPM | 51 | 36 | 34 |
| 100 RPM | 47 | 34 | 32 |
| 6 RPM | 14 | 20 | 16 |
| 3 RPM | 9 | 11 | 11 |
| 10 sec Gel (Pa) | 5 | 5 | 6 |
| PV (mPa * s) | 8 | 11 | 8 |
| YP (Pa) | 23.5 | 13 | 14 |
| LSRV (cP) | 27,000 | 14,000 | 33,000 |
| Temperature (° C.) | 20.1 | 20.1 | 20.1 |

Note:
Lignite dissolves slower.

TABLE 12

Results using Potassium Formate

| Mud Properties | Sample #1 + 5% Pot. Formate | Sample #1 + 5% Pot. Formate + 5 kg/m3 Lignite | Sample #1 + 5% Pot. Formate + 15 kg/m3 Lignite |
| --- | --- | --- | --- |
| 600 RPM | 50 | 46 | 42 |
| 300 RPM | 40 | 33 | 33 |
| 200 RPM | 37 | 30 | 30 |
| 100 RPM | 32 | 28 | 29 |
| 6 RPM | 9 | 9 | 14 |
| 3 RPM | 5 | 8 | 10 |
| 10 sec Gel (Pa) | 3 | 4 | 5 |
| PV (mPa * s) | 10 | 13 | 9 |
| YP (Pa) | 15 | 10 | 12 |
| LSRV (cP) | 30,000 | 29,000 | 31,000 |
| Temperature (° C.) | 20.1 | 20.1 | 20.1 |

TABLE 13

Results using Calcium Nitrate

| Mud Properties | Sample #1 + 5% Calcium Nitrate | Sample #1 + 5% Calcium Nitrate + 5 kg/m3 Lignite | Sample #1 + 5% Calcium Nitrate + 15 kg/m3 Lignite |
| --- | --- | --- | --- |
| 600 RPM | 58 | 49 | 44 |
| 300 RPM | 52 | 42 | 38 |
| 200 RPM | 50 | 41 | 37 |
| 100 RPM | 47 | 35 | 32 |
| 6 RPM | 12 | 11 | 14 |
| 3 RPM | 8 | 8 | 8 |
| 10 sec Gel (Pa) | 5 | 4.5 | 4.5 |
| PV (mPa*s) | 6 | 7 | 6 |
| YP (Pa) | 23 | 17.5 | 16 |
| LSRV (cP) | 35,000 | 43,000 | 23,000 |
| Temperature (° C.) | 20.1 | 20.1 | 20.1 |

Note:
Lignite dissolves slower.

TABLE 14

Results using Calcium Chloride

| Mud Properties | Sample #1 + 5% Calcium Chloride | Sample #1 + 5% Calcium Chloride + 5 kg/m3 Lignite | Sample #1 + 5% Calcium Chloride + 15 kg/m3 Lignite |
| --- | --- | --- | --- |
| 600 RPM | 63 | 48 | 43 |
| 300 RPM | 50 | 37 | 34 |
| 200 RPM | 42 | 34 | 31 |
| 100 RPM | 35 | 29 | 29 |
| 6 RPM | 13 | 12 | 13 |
| 3 RPM | 10 | 9 | 11 |
| 10 sec Gel (Pa) | 6.5 | 6.5 | 7 |
| PV (mPa * s) | 13 | 11 | 9 |
| YP (Pa) | 18.5 | 13 | 11.5 |
| LSRV (cP) | 40,000 | 37,000 | 27,000 |
| Temperature (° C.) | 20.1 | 20.1 | 20.1 |

Note:
Lignite dissolves slower.

TABLE 15

Results using Potassium Sulfate

| Mud Properties | Sample #1 + 5% Pot. Sulfate | Sample #1 + 5% Pot. Sulfate + 5 kg/m3 Lignite | Sample #1 + 5% Pot. Sulfate + 15 kg/m3 Lignite |
|---|---|---|---|
| 600 RPM | 165 | 128 | 91 |
| 300 RPM | 150 | 115 | 76 |
| 200 RPM | 143 | 109 | 71 |
| 100 RPM | 131 | 100 | 63 |
| 6 RPM | 85 | 67 | 42 |
| 3 RPM | 37 | 58 | 39 |
| 10 sec Gel (Pa) | 16 | 29 | 22 |
| PV (mPa * s) | 15 | 13 | 15 |
| YP (Pa) | 77.5 | 51 | 30.5 |
| LSRV (cP) | 100,000+ | 80,000 | 67,000 |
| Temperature (° C.) | 20.1 | 20.1 | 20.1 |

TABLE 16

Results using Sodium Sulfate

| Mud Properties | Sample #1 + 2% Sodium Sulfate | Sample #1 + 2% Sodium Sulfate + 5 kg/m3 Lignite | Sample #1 + 2% Sodium Sulfate + 15 kg/m3 Lignite |
|---|---|---|---|
| 600 RPM | 179 | 39 | 31 |
| 300 RPM | 155 | 25 | 19 |
| 200 RPM | 143 | 20 | 15 |
| 100 RPM | 123 | 14 | 9 |
| 6 RPM | 72 | 8 | 3 |
| 3 RPM | 63 | 7 | 2 |
| 10 sec Gel (Pa) | 31 | 5 | 2.5 |
| PV (mPa * s) | 24 | 14 | 13 |
| YP (Pa) | 65.5 | 5.5 | 4 |
| LSRV (cP) | 90,000 | 50,000 | 28,000 |
| Temperature (° C.) | 22.0 | 22.0 | 22.0 |

TABLE 17

Results using Sodium Sulfate

| Mud Properties | Sample #1 + 5% Sodium Sulfate | Sample #1 + 5% Sodium Sulfate + 5 kg/m3 Lignite | Sample #1 + 5% Sodium Sulfate + 15 kg/m3 Lignite |
|---|---|---|---|
| 600 RPM | 207 | 48 | 33 |
| 300 RPM | 174 | 38 | 22 |
| 200 RPM | 152 | 35 | 18 |
| 100 RPM | 124 | 31 | 13 |
| 6 RPM | 74 | 27 | 11 |
| 3 RPM | 67 | 26 | 10 |
| 10 sec Gel (Pa) | 28 | 14 | 9 |
| PV (mPa * s) | 33 | 10 | 11 |
| YP (Pa) | 70.5 | 14 | 5.5 |
| LSRV (cP) | 100,000 | 100,000 | 80,000 |
| Temperature (° C.) | 22.0 | 22.0 | 22.0 |

Example II

Background: Nr Wetaskiwin, Alberta, Drilled 222 mm hole to Intermediate Casing Depth of 1425 mMD and set casing at −86.2 degrees inclination in the Rex Coal formation. Set and cement 177.8 mm casing.

Drilling Fluid: 60 m3 of mud is premixed with the following formulation: 30 kg/m3 of natural bentonite is pre-hydrated in fresh water for 16 hours. 3 kg/m3 of PolyVis II (MMH) is added over 2 hours. pH is raised to 12.0 with caustic via chemical barrel over pre-mix tank. Fluid becomes viscous. 50 kg/m3 of Potassium Sulphate is added.

Drilling in Coal: Intermediate casing shoe and cement are drilled out with a 156 mm bit using water and then water is displaced over to the pre-mixed system, described above. This well was drilled horizontally in the Rex Coal formation using the pre-mixed system.

Fluid Properties prior to drilling coal:
Premix: 60 m3 circulating system.
Depth: 1425 m (87.2 degrees inclination)
Funnel Viscosity: 55 s/L
Mud density: 1050 kg/m3
pH: 12.0
600 reading: 64
300 reading: 61
200 reading: 60
100 reading: 56
6 reading: 36
3 reading: 23
PV (mPa·s): 3
YP (Pa): 29
Gels (Pa): 11/11
Filtrate (Fluid Loss, mls/30 min): no control
MBT: 30 Kg/m3
Potassium ion (mg/L): 25,000
Fluid properties after drilling to 1451 m in Rex Coal formation:
Depth: 1451 m (88 degrees inclination)
Funnel Viscosity: 66 s/L
Mud density: 1060 kg/m3
pH: 11.5
600 reading: 62
300 reading: 55
200 reading:—
100 reading:—
6 reading:—
3 reading:—
PV (mPa·s): 7
YP (Pa): 24
Gels (Pa): 6/10
Filtrate (Fluid Loss, mls/30 min): 60
MBT: 24 Kg/m3
Potassium ion (mg/L): 22,000

It was determined that the fluid viscosity remained substantially stable despite drilling pure coal.

Thereafter drilling continued to 1845 m in Rex Coal formation with the addition of 15×22.7 kg sacks of non-ionic starch (Unitrol Starch) for fluid loss control into 80 m3 system:

Fluid properties at depth 1845 m (91.4 degrees inclination):
Funnel Viscosity: 59 s/L
Mud density: 1050 kg/m3
pH: 12.0
600 reading: 64
300 reading: 56
200 reading:—
100 reading:—
6 reading:—
3 reading:—
PV (mPa·s): 8
YP (Pa): 24
Gels (Pa): 9/11
Filtrate (Fluid Loss, mls/30 min): 19
MBT: 22 Kg/m3
Potassium ion (mg/L): 20,400

The addition of starch doesn't affect the rheology substantially.

After drilling to 2050 m in the Rex Coal formation the fluid properties were as follows (89 m3 system):
Depth: 2050 m (87.8 degrees inclination)
Funnel Viscosity: 85 s/L
Mud density: 1050 kg/m3
pH: 12.0
600 reading: 80
300 reading: 70
200 reading: 65
100 reading: 60
6 reading: 47
3 reading: 44
PV (mPa·s): 10
YP (Pa): 30
Gels (Pa): 17/18
Filtrate (Fluid Loss, mls/30 min): 15
MBT: 25 Kg/m3
Potassium ion (mg/L): 22,500

It was determined that a mixed metal viscosified—natural bentonite type rheology can be maintained when drilling through coal with the present system.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are know or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

We claim:

1. A method for drilling in a coal containing formation, the method comprising:
providing a mixed metal-viscosified drilling fluid including at least 1% potassium salt;
circulating the drilling fluid through a well; and
drilling into the coal seam.

2. The method of claim 1 wherein providing the mixed metal-viscosified drilling fluid includes providing an aqueous-based drilling fluid including 15 to 45 kg/m3 bentonite, mixed metal viscosifier at a weight ratio of 1:8 to 1:12, viscosifier to bentonite, a base to maintain the pH above about 10.0 and at least 1% potassium salt.

3. The method of claim 1 wherein providing the mixed metal-viscosified drilling fluid includes providing an aqueous-based drilling fluid including about 30 kg/m3 bentonite, a mixed metal viscosifier in a quantity of about 1:10 mixed metal viscosifier to bentonite with a pH controlled to greater than pH 11 and 1 to 5% potassium salt.

4. The method of claim 1 wherein providing the mixed metal-viscosified drilling fluid includes:
mixing bentonite in water to form a bentonite mixture;
adding a mixed metal viscosifier to the bentonite mixture;
adjusting pH to greater than above about pH 10;
adding the potassium salt.

5. The method of claim 4 further comprising adding any of fluid loss control additives and/or lost circulation materials.

6. The method of claim 4 wherein the pH is adjusted using caustic soda, caustic potash, potassium carbonate or soda ash.

7. The method of claim 1 wherein providing the mixed metal-viscosified drilling fluid includes obtaining a drilling fluid with a yield point greater than 10 Pa.

8. The method of claim 1 continuing circulation with entrained coal fines in the drilling fluid.

9. The method of claim 8 wherein rheology of the drilling fluid is substantially maintained.

10. The method of claim 1 wherein circulating the drilling fluid is initiated prior to drilling into the coal seam.

11. The method of claim 1 wherein circulating the drilling fluid is maintained while a coal seam is open to the drilling fluid.

12. The method of claim 1 wherein circulating the drilling fluid is initiated substantially at surface.

13. The method of claim 1 wherein the potassium salt is selected from the group consisting of potassium sulfate, potassium chloride, potassium acetate and potassium formate.

14. The method of claim 1 wherein the potassium salt is potassium sulfate.

* * * * *